(12) United States Patent
I et al.

(10) Patent No.: US 7,748,213 B2
(45) Date of Patent: Jul. 6, 2010

(54) EXHAUST SYSTEM

(75) Inventors: Suki I, Hwa-Sung (KR); Kenichi Sato, Yokohama (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 845 days.

(21) Appl. No.: 11/633,644

(22) Filed: Dec. 5, 2006

(65) Prior Publication Data
US 2007/0125067 A1    Jun. 7, 2007

(30) Foreign Application Priority Data
Dec. 7, 2005    (JP) .............................. 2005-353194

(51) Int. Cl.
*F01N 3/00* (2006.01)
*F02M 25/06* (2006.01)

(52) U.S. Cl. .............................. 60/287; 60/285; 60/288; 60/295; 60/277; 60/278

(58) Field of Classification Search ................... 60/285, 60/295, 288, 277, 278
See application file for complete search history.

(56) References Cited

U.S. PATENT DOCUMENTS

| 5,524,433 | A | * | 6/1996 | Adamczyk et al. ............. 60/276 |
| 5,603,216 | A | * | 2/1997 | Guile et al. .................... 60/288 |
| 5,937,637 | A | * | 8/1999 | Fujishita et al. ............... 60/274 |
| 6,035,632 | A | * | 3/2000 | Stander et al. ................. 60/274 |
| 6,158,212 | A | | 12/2000 | Tanaka |
| 6,397,586 | B1 | * | 6/2002 | Sakurai et al. ................. 60/288 |
| 6,797,517 | B1 | | 9/2004 | Hoshi et al. |
| 7,048,891 | B2 | * | 5/2006 | Kinugawa et al. ............. 422/94 |
| 2003/0046926 | A1 | * | 3/2003 | Watanabe et al. ............. 60/278 |
| 2003/0061802 | A1 | * | 4/2003 | Nakatani et al. .............. 60/284 |
| 2004/0194449 | A1 | * | 10/2004 | Schaller et al. ............... 60/285 |
| 2004/0250609 | A1 | | 12/2004 | Shirakawa et al. |
| 2006/0137330 | A1 | | 6/2006 | I et al. |
| 2006/0174607 | A1 | | 8/2006 | Mori et al. |
| 2006/0225408 | A1 | | 10/2006 | Inoue et al. |
| 2006/0236682 | A1 | | 10/2006 | I et al. |

FOREIGN PATENT DOCUMENTS

| CN | 1536206 A | 10/2004 |
| EP | 0 757 568 A1 | 8/1996 |
| EP | 1 188 909 A2 | 3/2002 |
| JP | 05-321644 | 12/1993 |
| JP | H06-066130 A | 3/1994 |
| WO | WO-00/3130 | 1/2000 |

* cited by examiner

*Primary Examiner*—Thomas E Denion
*Assistant Examiner*—Michael Carton
(74) *Attorney, Agent, or Firm*—Global IP Counselors, LLP (57) ABSTRACT

An exhaust gas passageway of an internal combustion engine is basically provided with a main exhaust passageway, a bypass exhaust passageway, a bypass catalytic converter provided in the bypass exhaust passageway, a bypass control valve, an upstream air-fuel ratio sensor and a downstream air-fuel ratio sensor. The bypass exhaust passageway bypasses a portion of the main exhaust passageway between an upstream junction and a downstream junction. The bypass control valve opens or closes a portion of the main exhaust passageway. The upstream air-fuel ratio sensor is disposed upstream of the bypass catalytic converter to sense air-fuel ratio of an exhaust gas flowing into the bypass catalytic converter. The downstream air-fuel ratio sensor is disposed downstream of the bypass catalytic converter to sense air-fuel ratio of the exhaust gas flowing out of the bypass catalytic converter.

19 Claims, 7 Drawing Sheets

EXHAUST SYSTEM

CROSS REFERENCE TO RELATED APPLICATION

This application claims priority from Japanese Patent Application No. 2005-353194, filed 12 Dec. 2005, the entire contents of which are incorporated herein by reference.

BACKGROUND OF THE INVENTION

1. Field of the Invention

The present invention generally relates to an exhaust system. More particularly, but not exclusively, the present invention relates to an exhaust system for an internal combustion engine having a main exhaust passageway and a bypass exhaust passageway.

2. Background Information

It is known for exhaust systems of internal combustion engines to be provided with a catalytic converter arranged relatively downstream within the exhaust system for purifying the exhaust gases emitted by the engine, thereby to reduce the emission of environmental pollutants. The performance of the catalytic converter in purifying the exhaust gases depends on its being "activated", which requires the temperature of the catalytic converter to be raised to a predetermined level, usually by heat transfer from the exhaust gases passing through it. On the other hand, excessive heating of the catalytic converter can cause deterioration to the catalyst.

It follows, therefore, that the positioning of the catalytic converter within the exhaust system may be an important factor in its performance. For example, if the catalytic converter is disposed too far upstream of the exhaust system, i.e. closer to the engine, durability may be reduced due to thermal deterioration of the catalyst. Conversely, the further downstream that the catalytic converter is located within the exhaust system, the longer it takes for the catalytic converter's temperature to be raised to a level sufficient for it to be activated after cold starting of the engine. As a result, the desired level of exhaust purification may not be realized during this time.

Japanese Patent Application Laid-Open No. 5-321644 discloses an exhaust system which is intended to address this problem. In this known exhaust system, a bypass exhaust path or passageway is provided in parallel with a portion of a main exhaust path or passageway upstream of a main catalytic converter disposed therein. A bypass catalytic converter is provided in the bypass exhaust passageway. In this arrangement, immediately after cold starting, exhaust gases are guided or diverted through the bypass exhaust passageway by a bypass control valve which is operable between a first position, in which the bypass exhaust passageway is open and the main exhaust passageway is substantially closed off, and a second position, in which the main exhaust passageway is open and the bypass exhaust passageway is substantially blocked off. Since the bypass catalytic converter is located relatively more upstream than the main catalytic converter in the exhaust system, and hence is activated more quickly following engine cold starting than the main catalytic converter, then exhaust purification can advantageously be started more rapidly. Once the internal combustion engine has warmed up and/or reached its optimal operating temperature, the bypass control valve shifts from the first position to the second position thereby to guide the exhaust gases to the main exhaust passageway and hence through the main catalytic converter.

SUMMARY OF THE INVENTION

If the bypass catalytic converter suffers from deterioration, it may not be completed to reduce the emission of environmental pollutants. It would be advantageous, therefore, to perform deterioration diagnosis on the bypass catalytic converter. Such deterioration could monitor the degree of the deterioration of the catalyst in the catalytic converter, for example, by the use of known air-fuel ratio sensors disposed upstream and downstream thereof. However, since the bypass control valve is in the second position after completion of engine warm-up, the bypass control valve is necessary to be temporarily switched from the first position to the second position for a short period of time to divert the exhaust gases through the bypass exhaust passageway, and hence through the bypass catalytic converter. The present applicants have identified the following problems with this approach. Firstly, with respect to the durability of the bypass control valve it is undesirable to switch the bypass control valve between the first and second positions solely for the purpose of performing the deterioration diagnosis. Secondly, each time that the bypass control valve moves from the first position to the second position thereby to direct the flow of exhaust gases through the bypass exhaust passageway, a torque difference occurs due to the increase in back pressure associated with the change in exhaust passageway and this is undesirable in terms of operability. In addition, the frequency of deterioration diagnosis must inevitably be reduced, thereby reducing reliability of the diagnosis.

One object of the present invention is to address the above-described disadvantages and to improve upon known technology. Other objects and advantages of the invention will become apparent from the following description, claims and drawings. In order to achieve the above mentioned object and other objects of the present invention, an exhaust gas passageway of an internal combustion engine is provided that basically comprises a main exhaust passageway, a bypass exhaust passageway, a bypass catalytic converter, a bypass control valve, an upstream air-fuel ratio sensor and a downstream air-fuel ratio sensor. The bypass exhaust passageway is in fluid communication with the main exhaust passageway so as to bypass a portion thereof between an upstream junction at which the bypass exhaust passageway branches out of the main exhaust passageway and a downstream junction at which the bypass exhaust passageway merges into the main exhaust passageway. The bypass catalytic converter is provided in the bypass exhaust passageway. The bypass control valve is provided in the portion of the main exhaust passageway and configured to open or close the portion of the main exhaust passageway. The upstream air-fuel ratio sensor is disposed upstream of the bypass catalytic converter to sense air-fuel ratio of an exhaust gas flowing into the bypass catalytic converter. The downstream air-fuel ratio sensor is disposed downstream of the bypass catalytic converter to sense air-fuel ratio of the exhaust gas flowing out of the bypass catalytic converter.

Within the scope of this application it is envisaged that the various aspects, embodiments and alternatives set out in the preceding paragraphs, in the claims and in the following description may be taken individually or in any combination thereof.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. For example, the illustrated embodiments of the present invention show an exhaust system or device provided in an in-line, four-cylinder internal combustion engine. However, the exhaust system of the present invention can be used with other engine configurations.

Figure 1:
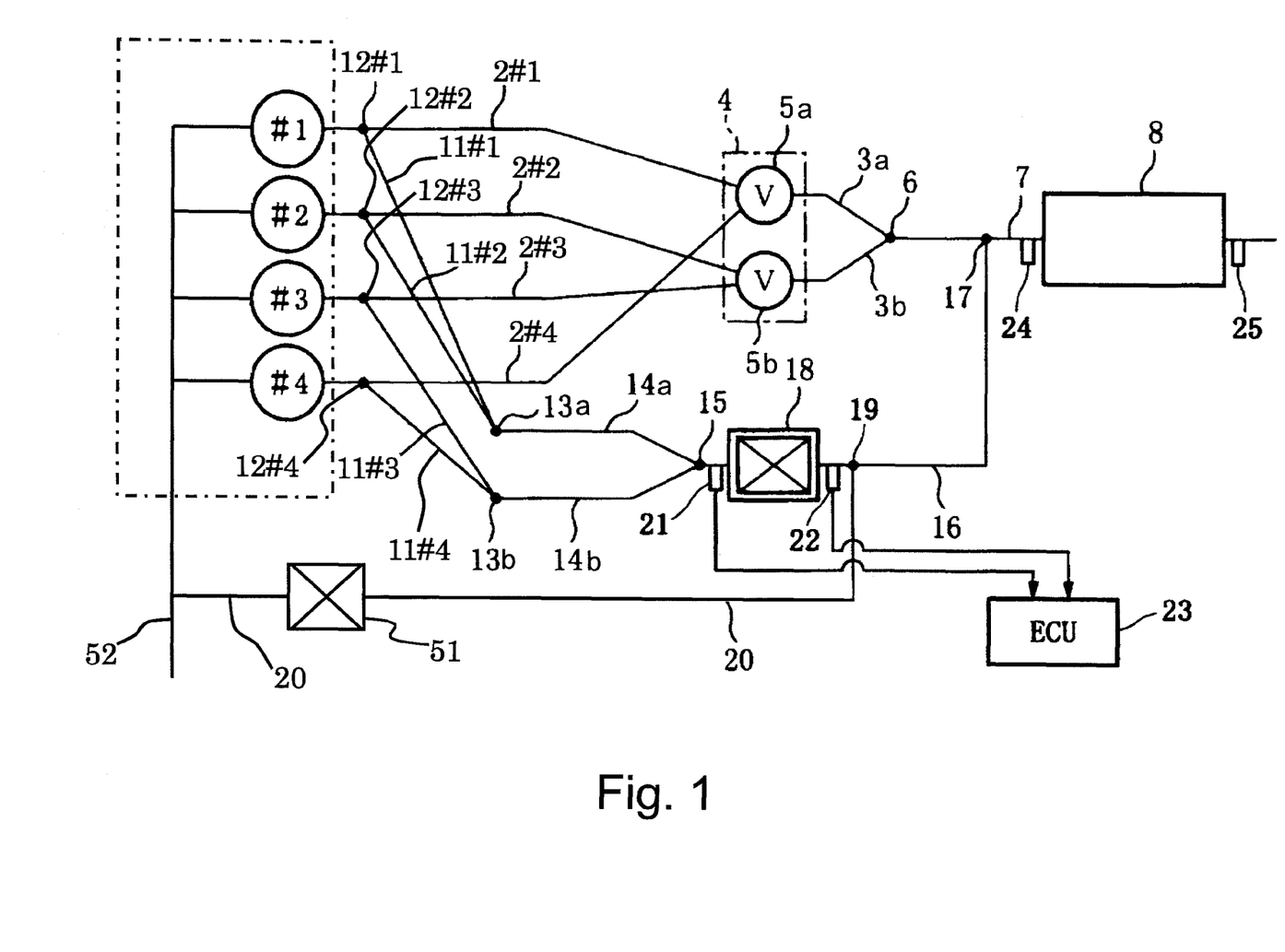
FIG. 1 is a simplified schematic diagram illustrating an exhaust system in accordance with a first embodiment of the present invention.

FIG. 1 schematically illustrates a piping layout of an exhaust system or device in accordance with a first embodiment of the present invention. The exhaust system is connected to the cylinders #1 to #4 of an internal combustion engine in a conventional manner. In the illustrated embodiment, the engine is a four cylinder, in-line engine, in which the cylinder firing sequence is #1-#3-#4-#2. In other words, adjacent cylinders do not fire in series.

As illustrated, the exhaust system has an upstream portion with a plurality of upstream main exhaust paths or passageways 2#1 to 2#4. Each of the passageways 2#1 to 2#4 are in fluid connection with a respective one of the cylinders #1-#4 so as to permit exhaust gases generated in the cylinder to be expelled therealong.

The upstream main passageways 2#1 and 2#4 are connected to the cylinders #1 and #4, respectively, and then merge into a first intermediate main passageway 3a by a bypass control valve 4. Similarly, the upstream main passageways 2#2 and 2#3 are connected to the cylinders #2 and #3, respectively, and then merge into a second intermediate main passageway 3b by the bypass control valve 4.

The bypass control valve 4 includes two valve elements 5a and 5b. Each of the valve elements 5a and 5b is arranged to merge a respective pair of upstream main passageways into one of the first or second intermediate main passageways 3a and 3b, respectively, as described above. The valve element 5a comprises a pair of valving elements (not shown) which are configured to open or close end portions of the upstream main passageways 2#1 and 2#4. Similarly, the valve element 5b comprises a pair of valving elements (not shown) which are configured to open or close end portions of the upstream main passageways 2#2 and 2#3. The bypass control valve 4 (that is to say, the valve element 5a and 5b) is operable to be not only in an open/closed position but also in an intermediate position so as to adjust an amount of the exhaust gas flowing through the bypass exhaust gas pass (or passageway) in accordance with an operating state of the internal combustion engine.

The bypass control valve 4 is configured to close in a cold operating state of the engine. In the closed state, the bypass control valve 4 cuts off fluid communication between the first pair of upstream main passageways 2#1 and 2#4 and the intermediate main passageway 3a and also between the second pair of upstream main passageways 2#2 and 2#3 and the intermediate main passageway 3b. In addition, in the closed state, the bypass control valve 4 prevents fluid communication between the individual upstream main passageways in each pair. In the illustrated embodiment, the bypass control valve 4 (including the valve elements 5a and 5b) is of a type in which a respective valving element contacts a seal face to thereby completely shut off the flow without permitting leakage.

The two intermediate main passageways 3a and 3b positioned downstream of the bypass control valve 4 merge together at a junction 6 into a single downstream main passageway 7. A main catalytic converter 8 is disposed in the downstream main passageway 7, for example, at a midpoint thereof. A catalyst used in the main catalytic converter 8 includes a three-way catalyst and an HC (hydrocarbon) trapping catalyst. The main catalytic converter 8 is arranged under the floor of the vehicle and has a large capacity.

The upstream main passageways 2#1 to 2#4, the intermediate main passageways 3a and 3b, the downstream main passageway 7, and the main catalytic converter 8 together form a main exhaust path or passageway, in a conventional "4-2-1" piping layout, through which exhaust gases produced by the internal combustion engine flow during normal vehicle operation. Such a "4-2-1" piping layout advantageously permits a filling efficiency improvement, known as "pulse tuning", associated with an exhaust gas dynamic effect to be realized.

The exhaust system additionally comprises a bypass exhaust path or passageway disposed generally in parallel with the main exhaust passageway. The bypass exhaust passageway comprises four upstream bypass passageways 11#1 to 11#4, each branched from a respective one of the upstream main passageway 2#1 to 2#4 at a branch point (upstream junction) 12#1 to 12#4, respectively. The branch points (upstream junctions) 12#1 to 12#4 are disposed as far upstream and/or as close to the engine as possible. Each of the upstream bypass passageway 11#1 to 11#4 has a smaller transverse cross-sectional area than the corresponding upstream main passageway 2#1-2#4, for reasons explained below.

The upstream bypass passageways 11#1 and 11 #2, which are associated with the cylinders #1 and #2, are disposed adjacent one another. The upstream bypass passageways 11#1 and 11#2 are merged at a junction 13a into a first intermediate bypass passageway 14a. Similarly, the upstream bypass passageways 11#3 and 11#4, which are associated with the cylinders #3 and #4, are disposed adjacent one another. The upstream bypass passageways 11#3 and 11#4 are merged at a junction 13b into a second intermediate bypass passageway 14b.

Although the upstream bypass passageways 11#1 to 11#4 are shown to be relatively long in FIG. 1, in practice it is desirable to make them as short as possible so that they are merged into their respective intermediate bypass passageways 14a and 14b at a relatively short distance.

Further downstream from the junctions 13a and 13b of the bypass exhaust passageway, the two intermediate bypass passageways 14a and 14b merge with one another at a junction 15 into a single downstream bypass passageway 16. The downstream end of the downstream bypass passageway 16 joins or merges into the downstream main passageway 7 at a downstream junction 17, which is located upstream of the main catalytic converter 8.

A bypass catalytic converter 18 is disposed in the downstream bypass passageway 16 at a position which is as upstream as possible. In other words, the intermediate bypass passageways 14a and 14b are also provided to be as short as possible. The bypass catalytic converter 18 includes a three-way catalyst similar to that of the main catalytic converter 8. The bypass catalytic converter 18 includes a well-known monolithic catalyst carrier, and has a relatively small capacity compared with the main catalytic converter 8. Preferably, a catalyst having high activity at low-temperatures is used.

In the embodiment of FIG. 1, the four upstream bypass passageways 11#1 to 11#4 are not lengthily routed round, but are converged into the two intermediate bypass passageways 14a and 14b in order to reduce the heat capacity and surface area of the piping itself by reducing the overall length of the bypass exhaust passageway, i.e. the sum of the bypass passageways for the respective cylinders. However, the configuration is arbitrary. For example, it may be desirable that the bypass catalytic converter 18 is located in a position adjacent to one of the in-line cylinders. In such a case, the upstream bypass passageways for the other cylinders can be coupled substantially at right angles to the upstream bypass passageway which extends linearly from the cylinder in question, thereby making it possible to reduce the overall length of the bypass exhaust passageway.

One end of an exhaust gas recirculation passageway 20, forming part of an exhaust gas recirculation system, is coupled to the downstream bypass passageway 16 at a branch point (junction) 19 disposed downstream of the bypass catalytic converter 18. The other end of the exhaust gas recirculation passageway 20 extends to a low pressure region, such as an engine intake pipe or manifold 52, via an exhaust gas recirculation (EGR) valve 51. Other embodiment of extending to the low pressure region is the other end opening to the atmospheric air or connecting with the downstream side of the main catalytic converter 8. The exhaust gas recirculation valve 51 is operable to be not only in an open/closed position but also in an intermediate position so as to adjust an amount of the exhaust gas recirculating through the exhaust gas recirculation passageway 20. The branch point 19 may be used as an outlet for recirculation exhaust gas.

A first, upstream air-fuel ratio sensor 21 is disposed on an upstream or inlet side of the bypass catalytic converter 18 and a second, downstream air-fuel ratio sensor 22 is disposed on a downstream or outlet side of the bypass catalytic converter 18. Each of the air-fuel ratio sensors 21 and 22 can be a so-called oxygen sensor that is arranged to output binary signals corresponding to rich and lean conditions in the exhaust gas air-fuel ratio. Alternatively, a so-called linear air-fuel ratio sensor can be used that is capable of producing a continually variable output corresponding to the air-fuel ratio value. As will be understood by the skilled person from this disclosure, detected signals of the air-fuel ratio sensors 21 and 22 are used not only for catalyst deterioration diagnosis, but are also used for general air-fuel ratio control, for example, air-fuel ratio control when the exhaust gas is guided into the bypass exhaust passageway.

In the illustrated embodiment, to ensure measurement accuracy and reduce component costs, a linear air-fuel ratio sensor is used for the upstream air-fuel ratio sensor 21 and an oxygen sensor is used for the downstream air-fuel ratio sensor 22. Signals from the air-fuel ratio sensors 21 and 22 are input into a deterioration diagnosis section, in the form of an engine control unit (ECU) 23. The ECU 23 is also connected to control objects or targets such as the bypass control valve 4 and the exhaust gas recirculation valve 51.

It will be appreciated that the ECU 23 can be arranged to perform not only catalyst deterioration diagnosis, but also various control operations for the internal combustion engine. Such control operations can include, for example, air-fuel ratio control, ignition timing control, on-off control for the bypass control valve 4 and on-off control for the exhaust gas recirculation valve 51. More specifically, the ECU 23 is configured to recognize or determine the open/close state of the bypass control valve 4 and conditions for exhaust gas recirculation. However, not all of the control operations have to be executed by the single ECU 23. The configuration can be such that a plurality of control units corresponding to the respective control operations is connected to one another to perform the control operations in cooperation.

In addition to the sensors described above, further air-fuel ratio sensors 24 and 25 are provided upstream and downstream, respectively (i.e. on the inlet and outlet sides, respectively), of the main catalytic converter 8 to perform air-fuel ratio control when the exhaust gas is guided into the main exhaust passageway. However, the sensors 24 and 25 are not directly associated with the catalyst deterioration diagnosis according to the present invention and detailed descriptions of their operation are therefore omitted.

Operation of the exhaust system of FIG. 1 will now be described. Immediately following cold start of the engine, when the engine temperature and the exhaust gas temperature are low, the bypass control valve 4 is closed, by an appropriate actuator, thereby to close or cut off the main exhaust passageway. Consequently, substantially all of the exhaust gas expelled or discharged from each of the cylinders #1 to #4 flows through the bypass exhaust passageway from the branch points 12#1 to 12#4 through a respective one of the upstream bypass passageways 11#1-11#4 and the intermediate bypass passageways 14a and 14b to the bypass catalytic converter 18.

As described above, the bypass catalytic converter 18 is positioned as upstream as possible on the bypass exhaust passageway, i.e. relatively close to the engine system and is relatively small in size as compared with the main catalytic converter 8. Consequently, the temperature of the bypass catalytic converter 18 rises rapidly which is therefore able to activate relatively quickly. Hence, exhaust purification is promptly started.

In this condition, with the bypass control valve 4 being closed, the upstream main passageways 2#1 to 2#4 are closed off from one another. This prevents the circulation of exhaust gases expelled from one of the cylinders into the upstream main passageways for the other cylinders so that temperature reduction associated with such circulation is prevented.

Once the temperature of the main catalytic converter 8 has increased sufficiently or to a predetermined level following warming of the engine or of the exhaust gases, the bypass control valve 4 is opened. Thereafter the exhaust gases expelled from each of the cylinders #1 to #4 are conducted primarily through the main exhaust passageway. In other words, the exhaust gases is expelled through respective upstream main passageways 2#1 to 2#4, the intermediate main passageways 3a and 3b, the downstream main passageway 7 and the main catalytic converter 8.

As described above, the main exhaust passageway side is configured as a "4-2-1" piping layout in consideration of the exhaust gas interference prevention and so that a filling efficiency improvement effect, associated with the exhaust gas dynamic effect, can be realized. On the other hand, although the bypass exhaust passageway is arranged without specific consideration of any exhaust gas interference effect, the transverse cross-sectional areas of the upstream bypass passageways 11#1 to 11#4 are reduced. Thereby, exhaust gas interference associated with communication with the respective cylinders can be reduced to a substantially negligible level.

When the cross-sectional areas of the upstream bypass passageways 11#1 to 1#4 are increased beyond a predetermined upper limit, a reduction in the filling efficiency associated with the exhaust gas interference occurs. Conversely, when the cross-sectional areas are reduced below a predetermined lower limit, the volume of exhaust gas flow during the closed state of the bypass control valve 4 is excessively restricted which reduces the performance of the exhaust system. Consequently, an optimal total transverse cross-sectional area of the upstream bypass passageways 11#1 to 11#4 falls within the range between the predetermined upper and lower limit sizes according to the volumetric flow of exhaust gas of the engine.

It will be appreciated from the above that, even when the bypass control valve 4 is opened, the bypass exhaust passageway is not specifically cut off therefrom. However, since the cross-sectional area of each of the upstream bypass passageways 11#1 to 11#4 is smaller than that of the upstream main passageways 2#1 to 2#4, and since the bypass catalytic converter 18 is inserted therein, the relatively greater resistance presented by the bypass exhaust passageway causes most of the exhaust gas flow to pass through the main exhaust passageway. Thus, very little exhaust gas flows through the bypass exhaust passageway, and hence through the bypass catalytic converter 18, and therefore thermal deterioration of the bypass catalytic converter 18 is reduced.

In addition, since the bypass exhaust passageway is not completely closed off from the main exhaust passageway, in a high speed and high load event causing an increase in the volume of the exhaust gas flow, a part of the exhaust gas is able to flow through the bypass exhaust passageway, thereby reducing the negative effect of back-pressure on engine filling efficiency. In other words, it is possible to prevent filling efficiency from being reduced by back pressure.

As described above, in order for the air-fuel ratio sensors 21 and 22 to perform the desired deterioration diagnosis on the bypass catalytic converter 18, it is necessary for the bypass catalytic converter 18 to have reached the activation temperature and to be operating with a sufficient flow rate of exhaust gases passing through it. However, when the bypass control valve 4 is closed, the volume of exhaust gas passing through the bypass exhaust passageway, and hence through the bypass catalytic converter 18, may not be sufficient to enable the sensors 21 and 22 to perform the deterioration diagnosis on the bypass catalytic converter 18.

However, in the illustrated embodiment, it is possible to increase the flow of exhaust gases through the bypass exhaust passageway, and hence through the bypass catalytic converter 18, to a level sufficient to enable the sensors 21 and 22 to perform the desired deterioration diagnosis. To achieve this increase in flow through the bypass exhaust passageway, the exhaust gas recirculation valve 51 in the exhaust gas recirculation system is opened. This operating state has the effect of connecting the downstream bypass passageway 16 to a low pressure region at the intake side of the engine (i.e. the intake system 52) and, at the same time, effectively eliminating the effects of the restrictive elements downstream of the bypass catalytic converter 18, namely the main catalytic converter 8. The effective resistance presented by the bypass exhaust passageway is thereby reduced.

Thus, during normal operating conditions of the exhaust system, i.e. after the engine has warmed up and the bypass control valve 4 is open, opening of the exhaust gas recirculation valve 51 causes part of the exhaust gas expelled from each of the cylinders #1 to #4 to flow from the branch points 12#1 to 12#4 through the bypass catalytic converter 18 via the upstream bypass passageways 11#1 to 11#4 and the intermediate bypass passageways 14a and 14b. Furthermore, after having passed through the bypass catalytic converter 18, the exhaust gas flows from the branch point (junction) 19 into the exhaust gas recirculation passageway 20.

In other words, even in the state where the bypass control valve 4 is open, such that the exhaust gas flow is guided to the main exhaust passageway, some of the recirculation flow passes through the bypass catalytic converter 18 during the exhaust gas recirculation while part of the volume of the recirculation flow reverses through the downstream bypass passageway 16 from the downstream junction 17 of the downstream main passageway 7 and is then ingested by the exhaust gas recirculation passageway 20.

This increase in exhaust gas flow through the bypass catalytic converter 18 is sufficient to enable the desired catalyst deterioration diagnosis to be performed by the upstream air-fuel ratio sensor 21 and the downstream air-fuel ratio sensor 22 using any suitable method. For example, the degree of catalyst deterioration can be determined in accordance with a frequency variation on the upstream and downstream sides with respect to, for example, either a periodical variation of the exhaust gas air-fuel ratio associated with air-fuel ratio feedback control or a variation in delay of response to a step-wise variation in air-fuel ratio for diagnosis.

To reiterate, the bypass control valve 4 is controlled initially to adopt a closed position so as to cause the exhaust gases from the engine to flow into the bypass exhaust passageway after the engine has started until the temperature of the engine (or the exhaust gases) reaches a predetermined level. Once the predetermined temperature level has been reached, the bypass control valve 4 is then switched to the open position so as to cause the exhaust gases from the engine to flow through the main exhaust passageway. In this open condition of the bypass control valve 4, even though the bypass exhaust passageway is not specifically cut off from the main exhaust passageway, the difference in resistances of the exhaust passageways causes most of the exhaust gases to flow through the main exhaust passageway via the upstream main passageways 2#1 to 2#4, the intermediate main passageways 3a, 3b, the downstream main passageway 7 and the main catalytic converter 8.

Then, by opening the exhaust gas recirculation valve 51 when the bypass control valve 4 is in the open state, either in the event of exhaust gas recirculation or specifically for the purposes of performing deterioration diagnosis on the bypass catalytic converter 18, an increased volume of exhaust gas flows from the branch point 12 into the bypass exhaust passageway, through the bypass catalytic converter 18 and then into the intake system 52 through the exhaust gas recirculation passageway 20.

Consequently, inasmuch as the operation is performed under the conditions where exhaust gas recirculation is carried out, a volume of the exhaust gas sufficient for the required deterioration diagnosis flows through the bypass catalytic converter 18 regardless of the open/close state of the bypass control valve 4. That is, the catalyst deterioration diagnosis can be accomplished regardless of the open/close state of the bypass control valve 4. Thus, after completion of engine/exhaust gas warm-up and shifting of the bypass control valve 4, the deterioration diagnosis is advantageously performed with the bypass control valve 4 maintained in the open state.

The catalyst deterioration diagnosis itself can be accomplished by any one of various known processes using the upstream air-fuel ratio sensor 21 and the upstream air-fuel ratio sensor 22.

Figure 2:
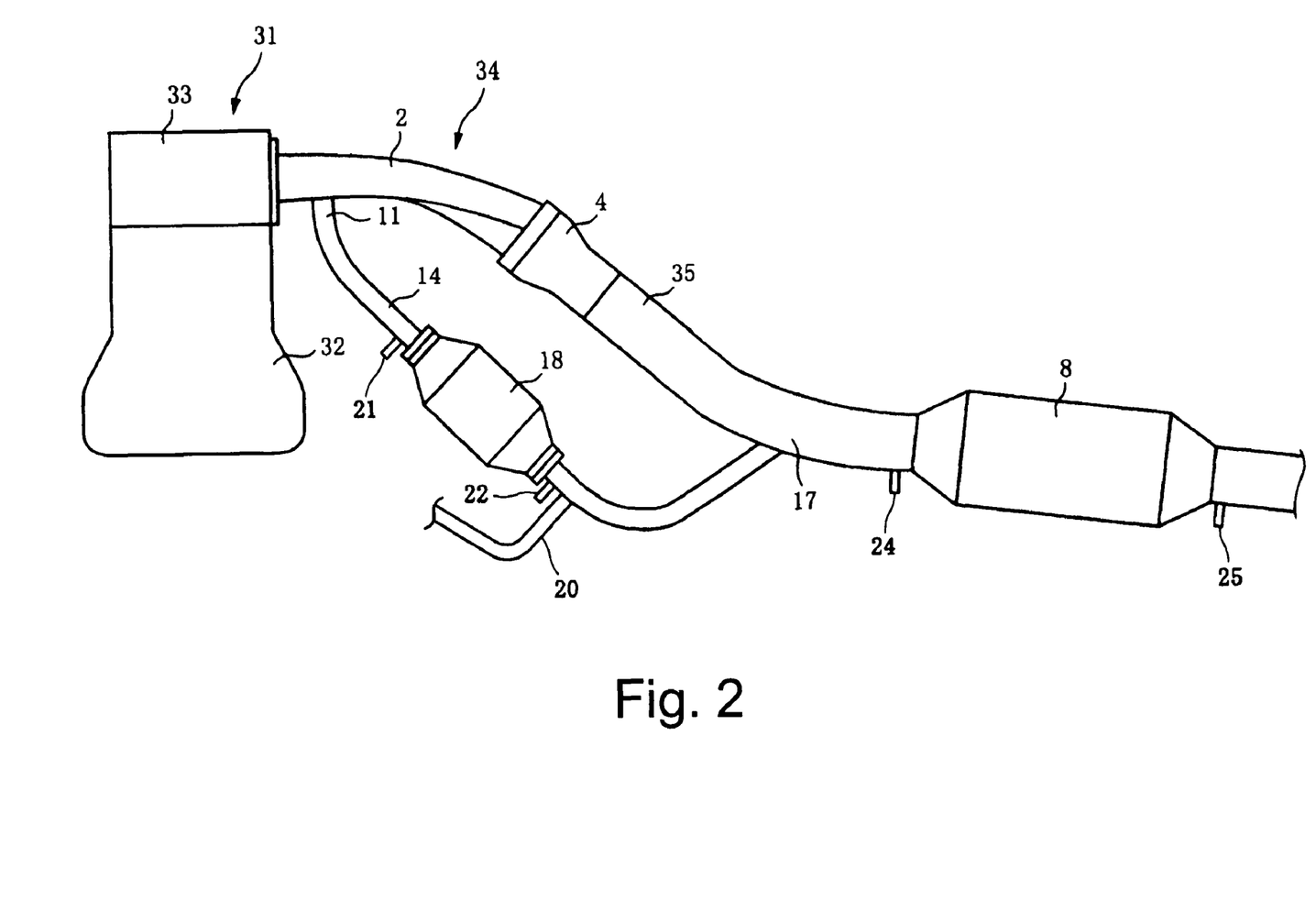
FIG. 2 is a side elevational view showing a part of the exhaust system of FIG. 1 in more detail.

FIG. 2 is a view showing a practical embodiment of the exhaust device of FIG. 1. Referring to FIG. 2, an internal combustion engine 31 basically comprises a cylinder block 32 and a cylinder head 33. The engine 31 is mounted in a so-called transverse arrangement in an engine room (not shown) of a vehicle. An exhaust gas manifold 34, forming at least a part of the upstream main passageways 2#1 to 2#4 is mounted to a rear sidewall of the cylinder head 33. The bypass control valve 4, which includes the valve elements 5a and 5b (shown in FIG. 1), is connected at its upstream end to an outlet portion of the exhaust gas manifold 34. The downstream end of the bypass control valve 4 is connected to a front tube 35, which forms at least a part of the downstream main passageway 7. An upstream portion of the front tube 35 is internally separated or divided into two passageways, thereby to form the intermediate main passageways 3. The main catalytic converter 8 is provided within the front tube 35 at a midpoint thereof.

The components of the bypass exhaust passageway, including the bypass catalytic converter 18 and the upstream, intermediate and downstream bypass passageways, are arranged in a space under the main exhaust passageway, rearward of the engine 31. The exhaust recirculation passageway 20 is branched from the downstream bypass passageway, downstream of the bypass catalytic converter 18, and extends forwardly to join the intake system 52 (not shown in FIG. 2) via the exhaust gas recirculation valve 51 (not shown in FIG. 2).

Figure 3:
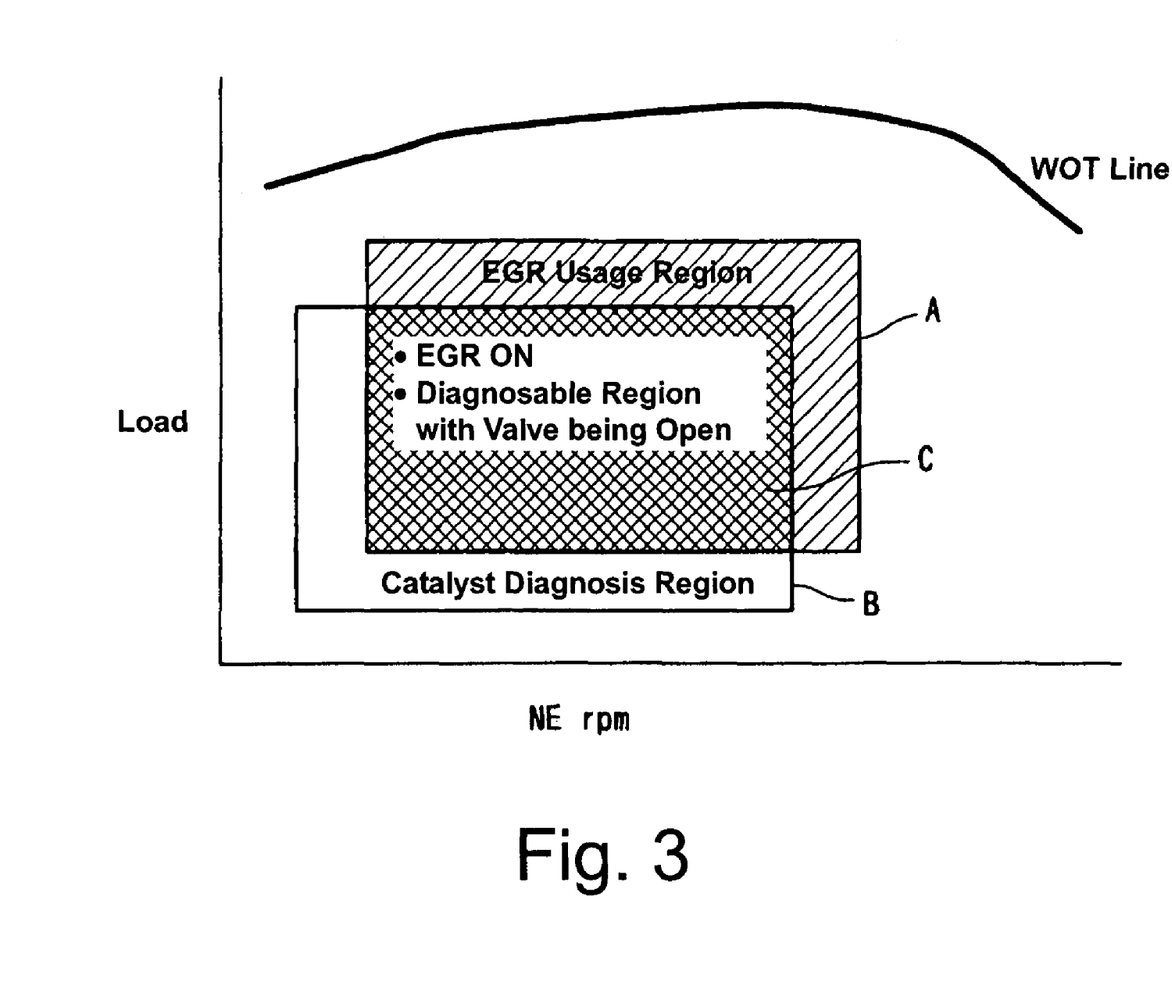
FIG. 3 is a characteristic diagram showing diagnosable regions.

FIG. 3 is a diagram illustrating a first operating region A, in which exhaust gas recirculation can be carried out, and a second operating region B (which is determined from a point of the air-fuel ratio, for example) in which general catalyst deterioration diagnosis can be carried out during normal operating conditions (load, engine speed) of the internal combustion engine. Using the exhaust system of FIG. 1, an overlapping range C of the two regions A and B is defined as a third operating region, known as a diagnosis region, in which the catalyst deterioration diagnosis of the bypass catalytic converter 18 can be performed regardless of the open/close state of the bypass control valve 4. As shown in the diagram, generally, the regions A and B are close to one another, thereby making it possible to frequently execute the catalyst deterioration diagnosis in a wide range of operating conditions.

Figure 4:
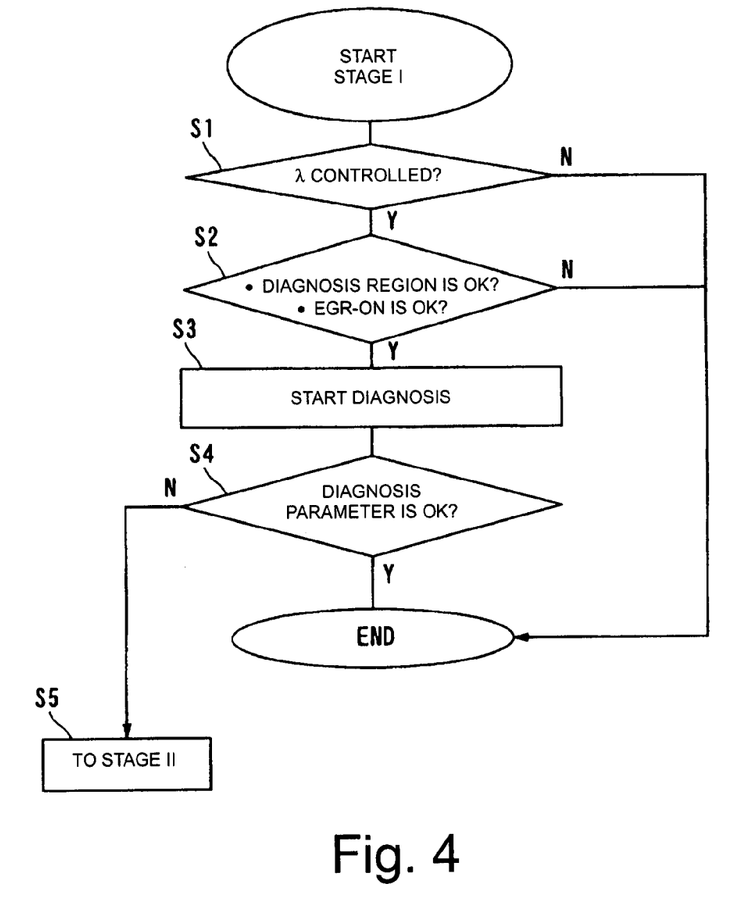
FIG. 4 is a flowchart diagram representing an example of a diagnosis process used in the exhaust system of the present invention.

FIG. 4 is a flowchart diagram representing an example of the process of catalyst deterioration diagnosis that is executed by the ECU 23. Initially, in step S1, it is determined whether or not air-fuel ratio feedback control is being performed. In the present example, a periodical variation in the exhaust gas air-fuel ratio according to the air-fuel ratio feedback control is used as stage I of the diagnosis. For this reason, if the air-fuel ratio feedback control is not being performed, then the diagnosis is not executed.

In step S2, it is determined whether or not the operating conditions are within the diagnosis region C and, concurrently, whether or not the exhaust gas recirculation is actually being performed ("ON"). Even within the exhaust gas recirculation region A (and within the diagnosis region C), exhaust gas recirculation is prohibited when, for example, the cooling water temperature is low. As such, unless exhaust gas recirculation is being performed, the diagnosis is not executed.

If these conditions are satisfied, the diagnosis is commenced in step S3 and a diagnosis parameter, such as a frequency ratio of detected signals of the upstream air-fuel ratio sensor 21 and the downstream air-fuel ratio sensor 22, is calculated.

In step S4, it is determined whether or not the diagnosis parameter is within an allowable range. If, in the above-described stage I, it is determined that the diagnosis result is "non-deterioration", and then the first diagnosis terminates. The stage I diagnosis is iterated in units of, for example, a fixed time period.

Alternately if, in step S4, the diagnosis parameter is out of the allowable range, the process proceeds to stage II starting with step S5, without quickly determining the instance to be abnormal. Although not shown in detail, in stage II the air-fuel ratio feedback control to attain the target air-fuel ratio is suspended. Thereafter, the objective air-fuel ratio is varied step-wise between lean and rich in a relatively wide range and responses of the respective upstream and downstream air-fuel ratio sensors 21 and 22 are compared thereto, thereby to perform the deterioration diagnosis. In other words, a so-called passive catalyst deterioration diagnosis is performed in stage I and a so-called active catalyst deterioration diagnosis is performed in stage II, whereby the diagnosis accuracy is enhanced and the diagnosis is prevented from erroneously determining the target to be abnormal.

The following describes the reduction or substantial elimination of the effect of reversed exhaust gas incoming from the main exhaust passageway. As described above, even with the bypass control valve 4 being in the open state, during exhaust gas recirculation, most of the recirculation flow flows through the bypass exhaust passageway and then through the bypass catalytic converter 18. However, a part of the volume of the recirculation flow reverses through the downstream bypass passageway 16 from the downstream junction 17 of the downstream main passageway 7 and is then ingested by the exhaust gas recirculation passageway 20.

In other words, in the exhaust system of FIG. 1 described above, during exhaust gas recirculation with the bypass control valve 4 set to the open state, exhaust gases can flow in the reverse direction through the downstream bypass passageway 16 from the downstream junction 17 with the downstream main passageway 7 toward the exhaust gas recirculation passageway 20, depending upon a practical piping layout and operating conditions. It is understood that the exhaust gas thus reversed from the main exhaust passageway has not passed through the bypass catalytic converter 18 when it reaches the exhaust gas recirculation passageway 20. Should some of the reversed exhaust gases come into contact with the downstream air-fuel ratio sensor 22, therefore, errors may occur in the detected signal of the downstream air-fuel ratio sensor 22, thereby reducing the accuracy of the catalyst deterioration diagnosis.

Figure 5:
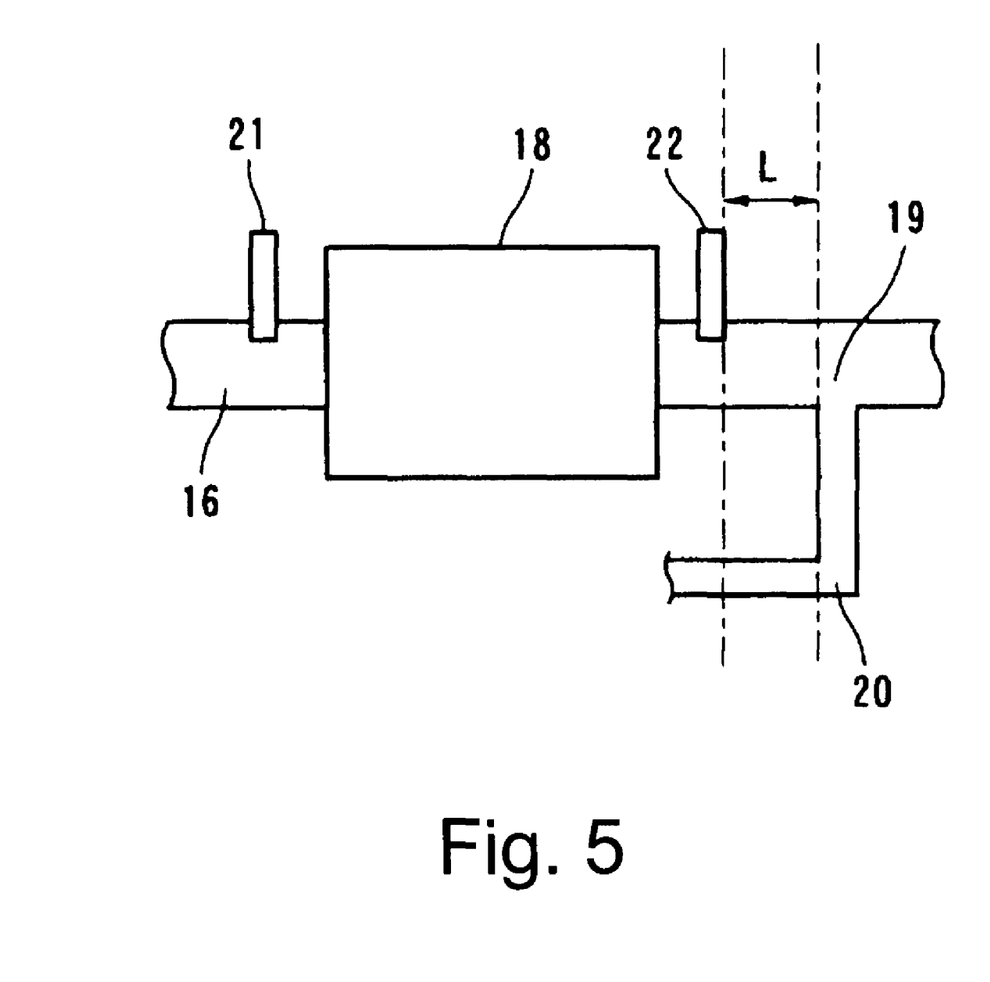
FIG. 5 illustrates a positional relationship between a branch point of an exhaust gas recirculation (EGR) passageway and a downstream air-fuel ratio sensor in accordance with the present invention.

For this reason, the downstream air-fuel ratio sensor 22 is advantageously disposed on the downstream bypass passageway 16 at a position upstream of the branch point (junction) 19 of the exhaust gas recirculation passageway 20 and spaced therefrom at a distance sufficient to reduce or substantially eliminate the effect of the reversed exhaust gas on the sensor. Specifically, as shown in FIG. 5, a prescribed distance L is provided between the branch point 19, at which the exhaust recirculation passageway 20 branches from the downstream bypass passageway 16, and the downstream air-fuel ratio sensor 22 which is arranged upstream of the branch point 19. The prescribed distance L is sufficiently large to reduce or substantially prevent the influence of the exhaust gas reversing through the downstream bypass passageway 16 from the downstream main passageway 7 to the exhaust gas recirculation passageway 20. The practical value of the prescribed distance L may vary from one specific application to another and depending upon various conditions such as the cross-sectional area and length of the various exhaust passageways in the exhaust system. Furthermore, the branch point (junction) 19 is placed away from the downstream junction 17 so as to reduce exhaust gas amount reversing through the downstream bypass exhaust passageway 16 from the downstream main exhaust passageway 7 to the exhaust gas recirculation passageway 20 in the open state of the bypass control valve 4. The reversing is well suppressed by spacing enough between the branch point (junction) 19 and the downstream junction 17.

Figure 6:
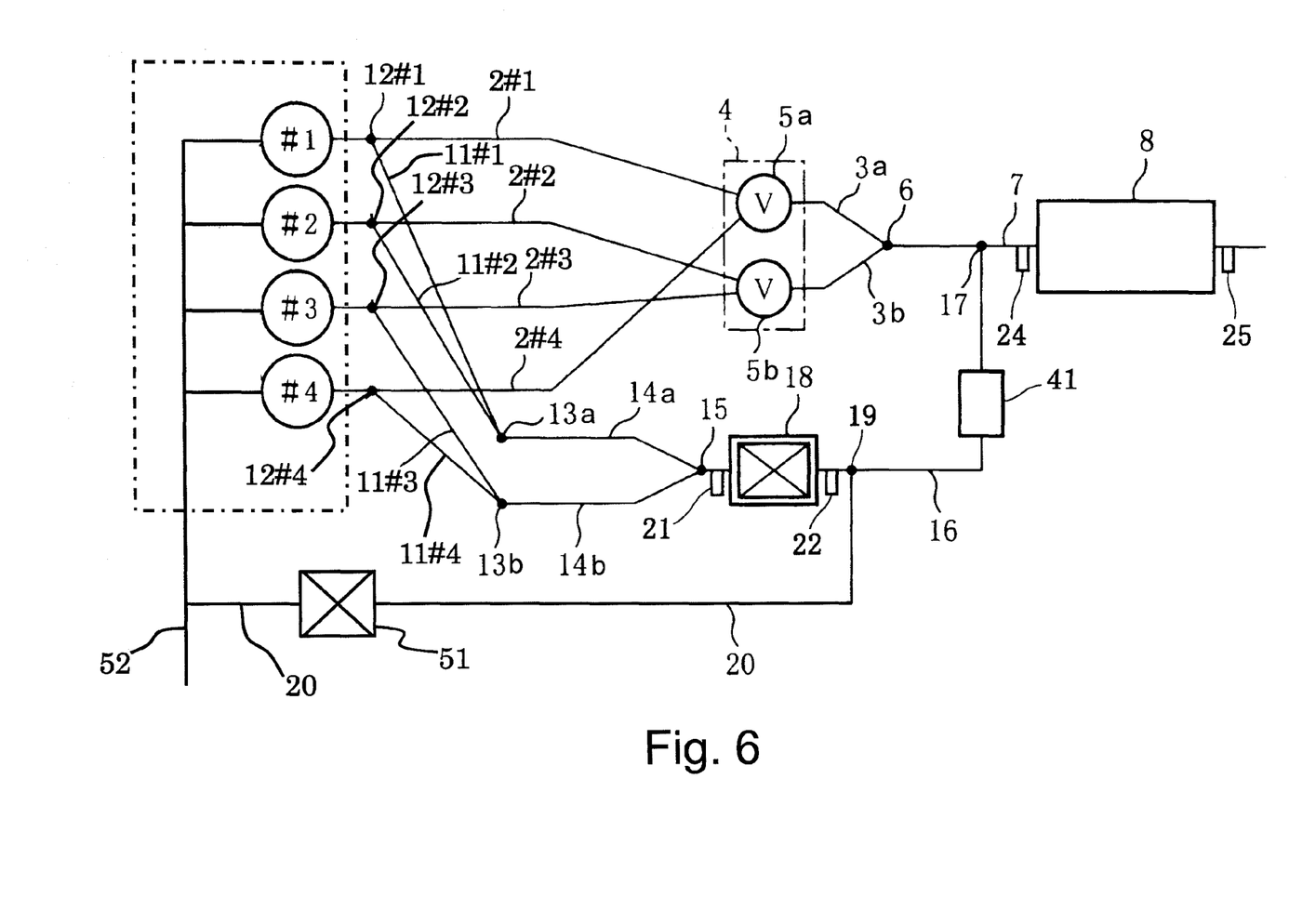
FIG. 6 is a simplified schematic diagram illustrating exhaust system in accordance with a second embodiment of the present invention in which a second bypass catalytic converter is provided.

Referring now to FIG. 6, a second embodiment of an exhaust system is illustrated in accordance with the present invention. The only difference between the first and second embodiments is the addition of a second bypass catalytic converter 41. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Also while the ECU 23 is not shown in this embodiment, the ECU 23 is connected to the sensors 21 and 22 in the same manner as FIG. 1 such that the diagnosis method for performing a deterioration diagnosis of the bypass catalytic converter 18 can be performed on this embodiment.

This exhaust system aims to reduce the reverse flow through the downstream bypass passageway. In this embodiment, the second bypass catalytic converter 41 is disposed in the downstream bypass passageway 16 at a position downstream of both the bypass catalytic converter 18 and the branch point 19, the latter therefore being located between the two bypass catalytic converters 18 and 41. In this configuration, the exhaust gas flowing in the reverse direction along the downstream bypass passageway 16 from the junction 17 with the downstream main passageway 7 during exhaust gas recirculation is limited by a pressure loss in the second bypass catalytic converter 41 and is thereby relatively restrained or reduced. Consequently, the detrimental effect on the downstream air-fuel ratio sensor 22 is reduced or substantially eliminated.

In the above-described configuration, the recirculation exhaust gas flowing to the intake system always passes through at least one of the bypass catalytic converters 18 and 41. An additional advantage can therefore be achieved in that foreign matter, if any, in the exhaust gas can be more easily removed so that it does not flow into the intake system.

Figure 7:
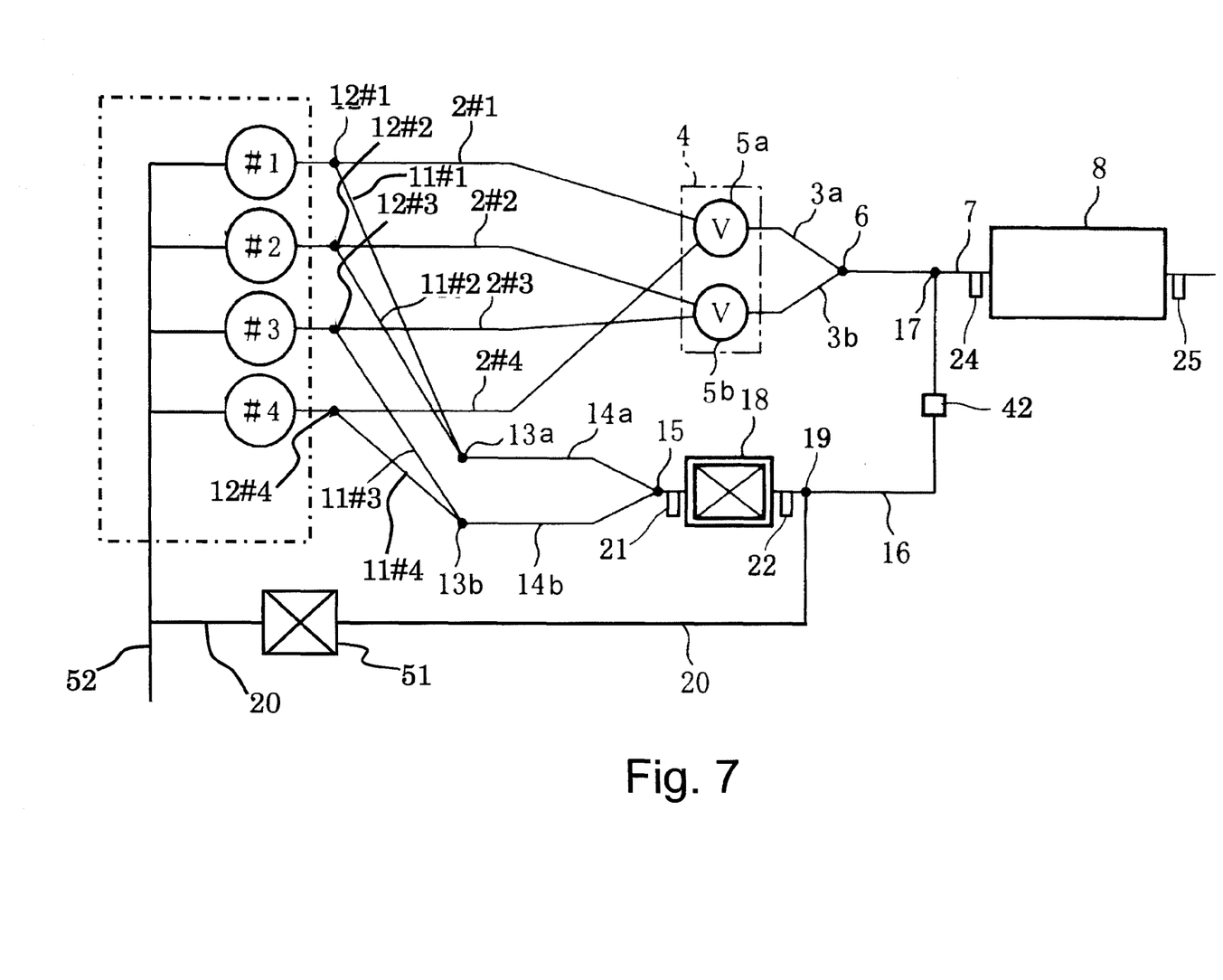
FIG. 7 is a simplified schematic diagram illustrating exhaust system in accordance with a third embodiment of the present invention in which an orifice or exhaust restricting device is provided.

Referring now to FIG. 7, a further embodiment of an exhaust system is illustrated in accordance with the present invention. The only difference between the first and second embodiments is the addition of an orifice or exhaust restricting device 42. In view of the similarity between this embodiment and the prior embodiments, the parts of this embodiment that are identical to the parts of the prior embodiments will be given the same reference numerals as the parts of the prior embodiments. Moreover, the descriptions of the parts of this embodiment that are identical to the parts of the prior embodiments may be omitted for the sake of brevity. Also while the ECU 23 is not shown in this embodiment, the ECU 23 is connected to the sensors 21 and 22 in the same manner as FIG. 1 such that the diagnosis method for performing a deterioration diagnosis of the bypass catalytic converter 18 can be performed on this embodiment.

In this embodiment, the orifice or exhaust restricting device 42 reduces the cross-sectional area of the downstream bypass passageway 16. The orifice or exhaust restricting device 42 is disposed in the downstream bypass passageway 16 at a position downstream of both the bypass catalytic converter 18 and the branch point 19, the latter therefore being located between the bypass catalytic converter 18 and the exhaust restricting device 42. In a similar manner to the above-described embodiment, the exhaust gas flowing in the reverse direction along the downstream bypass passageway 16 from the junction 17 with the downstream main passageway 7 during exhaust gas recirculation is limited by the orifice 42, and is therefore relatively restrained or reduced. Consequently, the influence on the downstream air-fuel ratio sensor 22 is reduced or substantially eliminated.

It will be understood from the foregoing that, in an exhaust system or device according to the present invention, regardless of the open/close state of the bypass control valve 4 for directing the exhaust gas flow to the bypass exhaust passageway and the main exhaust passageway, a deterioration diagnosis of the bypass catalytic converter 18 can be accomplished so that the bypass control valve 4 in, for example, the open position after warm-up completion does not have to be shifted or switched to the closed position. Consequently, an even wider diagnosable operation region can be secured, the diagnosis frequency can be increased, and adverse effects of, for example, torque differences associated with passageway shifting can be prevented.

While only selected embodiments have been chosen to illustrate the present invention, it will be apparent to those skilled in the art from this disclosure that various changes and modifications can be made herein without departing from the scope of the invention as defined in the appended claims. In other words, the preceding description has been presented only to illustrate and describe possible embodiments of the claimed invention. It is not intended to be exhaustive or to limit the invention to any precise form disclosed. It will be understood by those skilled in the art that various changes may be made and equivalents may be substituted for elements thereof without departing from the spirit and scope of the invention. For example, the size, shape, location or orientation of the various components can be changed as needed and/or desired. Therefore, the invention can widely be adapted to exhaust devices formed various layouts including main passageways and bypass passageways and will include all embodiments falling within the scope of the appended claims. Thus, the foregoing descriptions of the embodiments according to the present invention are provided for illustration only, and not for the purpose of limiting the invention as defined by the appended claims and their equivalents.

What is claimed is:

1. An exhaust system for an internal combustion engine comprising:
   a main exhaust passageway including a plurality of upstream main exhaust passageways in fluid communication with a respective one of a plurality of cylinders of the internal combustion engine and a downstream main exhaust passageway, with the upstream main exhaust passageways merging together to fluidly communicate with the downstream main exhaust passageway;
   a bypass exhaust passageway including a plurality of upstream bypass exhaust passageways in fluid communication with the upstream main exhaust passageways so as to bypass portions thereof between upstream junctions at which the upstream bypass exhaust passageways branch out of respective ones of the upstream main exhaust passageways and a downstream junction at which a downstream bypass exhaust passageway merges into the downstream main exhaust passageway, the upstream main exhaust passageways converging downstream of the upstream junctions;
   a bypass catalytic converter provided in the bypass exhaust passageway;
   a bypass control valve provided in the portions of the upstream main passageways and configured to open or close the portions of the upstream main passageways;
   an upstream air-fuel ratio sensor disposed upstream of the bypass catalytic converter to sense air-fuel ratio of an exhaust gas flowing into the bypass catalytic converter;
   a downstream air-fuel ratio sensor disposed downstream of the bypass catalytic converter to sense air-fuel ratio of the exhaust gas flowing out of the bypass catalytic converter.

2. The exhaust system according to claim 1 further comprising
   an exhaust gas branch passageway having a first end in fluid communication with the bypass exhaust passageway at a junction disposed downstream of the bypass catalytic converter and a second end in fluid communication with a low pressure region.

3. The exhaust system of claim 2 wherein
   the exhaust gas branch passageway is an exhaust gas recirculation passageway; and
   the second end of the exhaust gas recirculation passageway is in fluid communication with an intake system of the internal combustion engine.

4. The exhaust system according to claim 3, further comprising
   an exhaust gas recirculation valve disposed in the exhaust gas recirculation passageway to open and close the exhaust gas recirculation passageway.

5. The exhaust system according to claim 4, further comprising
   a controller connected to the upstream air-fuel ratio sensor and to the downstream air-fuel ratio sensor, and the controller being configured to perform a deterioration diagnosis of the bypass catalytic converter based on outputs of the upstream air-fuel ratio sensor and the downstream air-fuel ratio sensor.

6. The exhaust system according to claim 5, wherein
   the controller is connected to the exhaust gas recirculation valve to operate the exhaust gas recirculation valve between the closed and open positions and to perform the deterioration diagnosis of the bypass catalytic converter under a condition where exhaust gas recirculation is carried out.

7. The exhaust system according to claim 6, wherein
   the controller is further configured to determine an open/close state of the bypass control valve and to perform the deterioration diagnosis of the bypass catalytic converter when the bypass control valve is in an open state.

8. The exhaust system according to claim 2, wherein
   the downstream air-fuel ratio sensor is disposed at a position in the bypass exhaust passageway upstream of the junction and spaced therefrom by a distance necessary to at least reduce an influence of exhaust gas reversing through the bypass exhaust passageway from the main exhaust passageway to the exhaust gas branch passageway when the bypass control valve is in an open state.

9. The exhaust system according to claim 8, wherein
   the junction is located away from the downstream junction to reduce an exhaust gas amount reversing through the bypass exhaust passageway from the main exhaust passageway to the exhaust gas branch passageway when the bypass control valve is in the open state.

10. The exhaust system according to claim 2, wherein
    the bypass exhaust passageway includes a second bypass catalytic converter provided at a position downstream of the junction.

11. The exhaust system according to claim 2, wherein
    the bypass exhaust passageway includes an exhaust restricting device provided at a position downstream of the junction.

12. The exhaust system according to claim 7, wherein
    the controller is connected to the bypass control valve and is configured to close the bypass control valve during a cold operating state of the engine and to open the bypass control valve when the engine reaches a predetermined warm-up state.

13. The exhaust system according to claim 1, further comprising
    a controller connected to the upstream air-fuel ratio sensor and to the downstream air-fuel ratio sensor, and the controller being configured to perform a deterioration diagnosis of the bypass catalytic converter based on outputs of the upstream air-fuel ratio sensor and the downstream air-fuel ratio sensor.

14. A diagnosis method of performing a deterioration diagnosis of a bypass catalytic converter provided in an exhaust system of an internal combustion engine, the method comprising:
    controlling a bypass control valve for adjusting an amount of exhaust gas flowing through a bypass exhaust passageway which bypasses a main exhaust passageway;
    recirculating exhaust gas through the bypass catalytic converter disposed in the bypass exhaust passageway to an intake system such that an amount of exhaust gas flowing through the bypass catalytic converter is temporarily increased;
    measuring exhaust gas air-fuel ratios upstream and downstream of the bypass catalytic converter; and
    performing the deterioration diagnosis of the bypass catalytic converter in accordance with the air-fuel ratios during exhaust gas recirculation within the exhaust system while the bypass control valve is in an open state and while the amount of exhaust gas flowing through the bypass catalytic converter is temporarily increased.

15. The diagnosis method according to claim 14, wherein the bypass control valve is disposed in a portion of a main exhaust passageway located downstream of an upstream junction at which a bypass exhaust passageway branches out of the main exhaust passageway and upstream of a downstream junction at which the bypass exhaust passageway merges into the main exhaust passageway.

16. The diagnosis method according to claim 15, wherein the deterioration diagnosis is performed when the bypass control valve is in an open state.

17. The diagnosis method according to claim 16, wherein the controlling of the bypass control valve includes closing the bypass control valve during a cold operating state of the engine and opening the bypass control valve when the engine reaches a predetermined warm-up state.

18. A vehicle comprising the exhaust system of claim 1.

19. A vehicle comprising the exhaust system of claim 13.

\* \* \* \* \*